UNITED STATES PATENT OFFICE.

WALTER MAX WILHELM HORN, OF TEPLITZ, AUSTRIA.

CERAMIC MOLDABLE COMPOSITION.

1,251,888. Specification of Letters Patent. Patented Jan. 1, 1918.

No Drawing. Application filed June 9, 1913. Serial No. 772,572.

*To all whom it may concern:*

Be it known that I, WALTER MAX WILHELM HORN, a subject of the King of Prussia, residing at Teplitz, in Bohemia, Austria, have invented certain new and useful Improvements in Ceramic Moldable Compositions, of which the following is a specification.

This invention relates to the preparation of a ceramic material capable of being cast or molded and being particularly adapted for use as heating elements.

The object of the present invention is the production of a ceramic composition capable of being cast or molded, and which shall be suitable for the preparation of ceramic objects capable of considerable resistance to change in temperature, irregular heating, high pressure, and still also be impervious to water and thus particularly suitable, for example for the manufacture of ceramic heating elements.

The ceramic heating elements heretofore produced, do not fully meet these requirements. Ceramic heating elements to be successful, must have the following properties:—

First, the ceramic articles should possess considerable resistance to difference in temperature, not only as regards the capacity of an object formed of several portions, for example a heater formed of several elements, to withstand a slowly increasing temperature, one part being always hot and a neighboring portion cold. Heaters have to withstand such heating and cooling processes at the time when they are being put into or out of operation.

Practical tests have shown that ceramic heating elements, even if they have satisfied the above requirements for many months without apparent injury are liable to suddenly fail. Therefore the necessity arises, that this resistance of the article should continue as long as said article is used.

For hygienic and esthetic reasons the articles must possess a smooth surface and it therefore follows that the ceramic article employed must be capable of being glazed.

As in employing such material for the preparation of heating bodies through which steam or water is passed, the article must possess a high degree of impermeability. On the other hand, a degree of porosity is absolutely necessary, consequently the pores must be as small as possible.

The mass must possess a considerable degree of strength and elasticity, as objects formed from it are called upon to resist the pressure exerted upon them by the unions and fittings and also the internal pressure without breaking. For practical reasons a considerable degree of resistance to blows and knocks is also requisite.

In addition, in dealing with a mass suitable for casting, it is necessary to take into account the contraction in drying and burning which must not be great if the form of the article is to be properly retained, since by arranging such elements parallel one to the other, all inequalities become very apparent.

The mass must also be easily cast and exhibit to the eye a pleasant color.

It has been found that the ceramic masses hitherto employed, or known, do not possess the foregoing properties. Porcelain cannot be made into objects of the size required for the present purpose, or at least is very difficult to so manufacture. The requirements as to resistance and as to slight and uniform contraction are only partially fulfilled by burnt clay or broken saggars or burnt fireclay (chamotte), but with such materials a smooth surface was obtained which will not take the glaze. Burnt clay or broken saggars or burnt fireclay (chamotte) was also too porous and too permeable to steam and water. These properties are only possessed by earthenware, as this is a porous material which takes the glaze quite well.

Tests have shown that it is very difficult to combine all the required properties in any one material, so that it shall fulfil the requirements, as for the required degree or resistance or strength a certain degree of porosity is necessary, and this property is opposed to the requirements as to smoothness of surface, and for use as steam or hot water heating elements.

A ceramic article for this purpose must possess a porous nature, but the pores must be small so that the porosity gives a considerable degree of strength, a smooth surface and capacity for taking the glaze and a capacity for conducting steam or water in an equally satisfactory manner.

To fulfil the requirements as to resistance it is necessary that the mass shall contain a high proportion of alumina. The ceramic mass according to the present invention contains a higher percentage of alumina than any of the masses ordinarily employed.

For the requirements as to smoothness of surface and suitability for conducting steam or water a fine grain is required. It has been found that sodium or potassium compounds which exist for example as stone fragments, (feldspar, etc.) in the raw materials, impurities such as magnesia, iron, lime or similar fluxes have an unfavorable effect upon the resistance or strength of the mass. Such admixtures should be avoided so far as the character of the raw material will allow, and it constitutes a matter of considerable difficulty to prepare a ceramic mass, possessing to a satisfactory degree these properties, which to a large extent, are opposed to one another.

According to the present invention this problem is solved by the employment of a material high in alumina to which is added a suitable material for reducing the plasticity.

The masses hitherto employed contain quartz or fluxes such as feldspar, chalk and the like. The latter cannot be employed and further quartz is also unsuitable, as finely divided quartz does not furnish a porous but a dense ingredient, which also shows a tendency to form fusible products with the potassium compounds, the presence of which in the raw material it is impossible to entirely avoid and which have the effect of reducing the porosity of the clay used in the preparation of the heating elements and thus injures the required uniform and fine porosity of the mass to be used for the manufacture of radiators. The raw materials obtainable do not suffice for the preparation of a mass completely free from quartz, but the further addition of quartz is, however, to be avoided.

The use of pure burnt clay or broken saggars or burnt fireclay (chamotte) is also limited, its employment being restricted, in consequence of the fact that articles containing a high content of burnt clay or broken saggars or burnt fireclay chamotte are difficult to mold and difficult to prepare of a pleasant color.

According to the present invention the ceramic mass adapted to be molded is prepared from a highly aluminous raw material by the addition thereto of materials reducing the plasticity in such a way that the mass acquires the required uniform and finely developed degree of porosity; the said materials comprising porous materials or substances capable of forming porous materials, or capable of producing or leaving pores in the mass on burning.

A specially suitable medium consists of a mass composed of equal parts of burnt clay or broken saggars or burnt fireclay and of lean kaolin or lean clays, for example shale.

Such a mass meets all the requirements previously referred to, particularly for heating elements. Obviously variations may be made without departing from the spirit of the invention, for example the plastic, binding portion of the mass may be formed of a fat kaolin, and an addition of lean kaolin or clay added for the purpose of reducing the plasticity or semi-plastic clays may be used, but in all cases the mass is characterized by a high content of alumina and a fine grained uniform degree of porosity, which latter property can be obtained by the employment of suitable organic materials.

I call special attention to the fact that lean clay and not fat clay is employed in this process, since with fat clay the shrinkage would be so high, that the materials would either be unsuitable on account of cracking or warping or would be bent or twisted, owing to the unequal contraction, or else would be unsuitable on account of lacking the desired strength, or else would be uncapable of receiving the desired glaze.

What I claim is:

1. An argillaceous composition, containing a relative high proportion of alumina, and capable, when moistened, molded and baked of producing a finely porous, strong article, said mixture comprising finely powdered burnt clay and lean clay, in a state of intimate admixture.

2. An argillaceous composition, containing a relative high proportion of alumina, and capable, when moistened, molded and baked of producing a finely porous, strong article, said mixture comprising substantially equal parts of finely powdered burnt clay and lean clay, in a state of intimate admixture.

3. An argillaceous composition, containing a relative high proportion of alumina, and capable, when moistened, molded and baked of producing a finely porous, strong article, said mixture comprising finely powdered burnt fire clay and lean clay, in a state of intimate admixture, said materials being low in quartz, lime, magnesia and alkalis.

In testimony whereof I have hereunto set my hand in presence of two subscribing witnesses.

MAX HORN.

Witnesses:
 PAUL ARRAS,
 CLÁRE SIMON.